Figure 2:
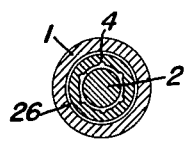

Nov. 6, 1956  Z. LORENIAN  2,769,201
SCREW EXTRUSION APPARATUS FOR MANUFACTURING ARTICLES
OF THERMOPLASTIC AND THERMOSETTING MATERIALS
Filed June 23, 1949  2 Sheets-Sheet 1

INVENTOR.
ZAREH LORENIAN
BY
ATTORNEY

Nov. 6, 1956 Z. LORENIAN 2,769,201
SCREW EXTRUSION APPARATUS FOR MANUFACTURING ARTICLES
OF THERMOPLASTIC AND THERMOSETTING MATERIALS
Filed June 23, 1949 2 Sheets-Sheet 2
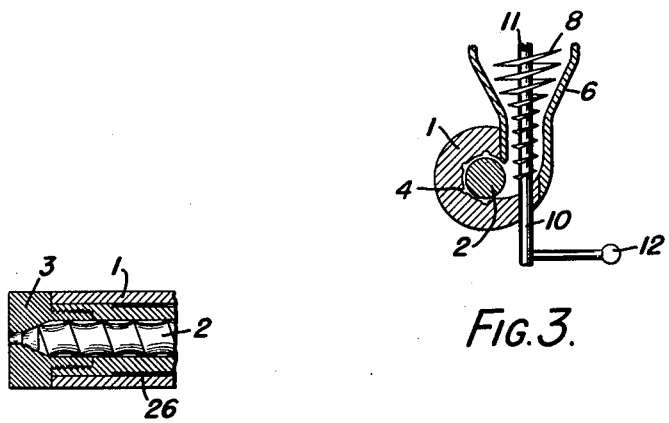
FIG. 3.
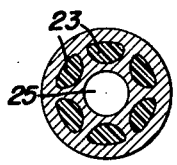
FIG. 4.
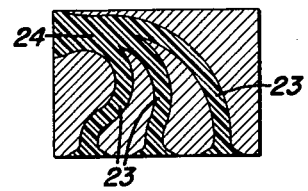
FIG. 7.
FIG. 8.
INVENTOR.
ZAREH LORENIAN
BY
ATTORNEY

United States Patent Office 2,769,201
Patented Nov. 6, 1956

2,769,201

SCREW EXTRUSION APPARATUS FOR MANUFACTURING ARTICLES OF THERMOPLASTIC AND THERMOSETTING MATERIALS

Zareh Lorenian, Milan, Italy

Application June 23, 1949, Serial No. 100,823

Claims priority, application Italy July 1, 1948

9 Claims. (Cl. 18—13)

This invention relates to certain improvements in or relating to screw presses. As is well known, screw presses, in which the material is conveyed by screw or worm members, are used for the working up or moulding of plastic and thermoplastic materials as well as materials capable of being hardened by heat. The walls of the cylinder on which the screw rotates are smooth. This causes disadvantages in the working up of moulding materials and, more particularly, of plastic and thermoplastic materials and materials capable of being hardened.

Owing to its elevated temperature the material tends to stick to the conveyor screw so that it will no longer be conveyed and extruded out of the nozzle of the machine. Moreover, the quality of the material is thereby deteriorated, and in fact in many instances it is even burnt or carbonized, whereby an irregular structure of the product results.

Moreover, it is known that where the material is fed to the pressing screw by hand and without pressure, irregularities, non-uniformities and faults are caused in regard to the products made by the machine. Moreover, it is known that for producing shaped articles of different colors and qualities which are either mixed or can be distinguished as parts connected at their joint, a special screw press is required for each of these colors or the like, whereby difficulties are caused in a technical and economical respect.

It is also known that the transverse or cross heads still used in the manufacture of shaped articles and/or the coating of the core of cables or other articles have the disadvantage that the materials fed from the pressing screw into the cross head owing to the friction in the cross section have different flowing speeds so that the various materials from which the article is formed, do not lie coaxially and/or parallelly to each other.

It is the object of the present invention to provide a method for the simultaneous production, by means of a screw press, of articles from one or more materials of equal or different properties and/or quality or color, or for the coating of any objects with thermoplastic materials, or materials which can be hardened by heat, of any properties and/or of different color, quality or other features.

Another object of the invention is to provide a method of the kind referred to, which avoids the above mentioned deficiencies and disadvantages of the processes now used for the production of articles by a screw press using the above mentioned materials.

According to the present invention the material to be worked up is fed into the pressing screw or screws tangentially or radially, by means of one or more conveyer screws, which are mounted for rotation in cylinders whose cylindrical surface is formed with interruptions, throughout its length or over part of its length only, which interruptions take the form of recesses of any shape and which are arranged longitudinally and whose size and mutual distance is adapted to the actual field of application. Ribs or the like may also be provided instead of these recesses or grooves. These interruptions of the inner cylindrical surface cause the material adhering to the press screw to be torn off or taken off, so that the above mentioned drawbacks are avoided and the material is at the same time homogenized.

In the same manner the mouthpieces, cross- or transverse heads, the nozzles and the like may also be provided at their inner surface with similar depressions or elevations which correspond with the respective parts of the cylindrical surface. The pressing screw advantageously is made with such a length that its end terminates near the mouthpiece or near the pressing piston or possibly projects into said parts of the press.

In order to produce shaped articles consisting of materials of a different color and/or quality and kind by means of a single screw press, a press screw with its companion cylinder may be arranged coaxially in the bore of a second press screw which in turn is arranged in a cylinder corresponding to its diameter. This telescoped arrangement of the press screws with their companion cylinders can be repeated as often as desired, depending on the kind of the article to be produced. The inner surfaces of the single cylinders can be shaped as above described. The press screws can be right-handed or left-handed and they may rotate with the same speed or with different speeds. The materials worked up by the press screws conflow either directly at the end of the screws, or in the cross head, or in the nozzle, or when leaving the same, or in a prearranged or preset die or mould, being joined or not joined at their boundaries.

According to a further feature of the invention feeding devices are mounted on the feeding openings in the cylinders of the pressing screws, through which feeding openings the materials of the single press screws are fed separately by a mechanical operation, continuously, regularly and with the desired rate of feed. In these feeding devices the materials can be preheated. Moreover, in their upper part they are provided with stirring means, e. g. blades or the like, for mixing and homogenizing the materials, and in their lower part or over the whole of their length they are provided with conveyer or press screws which feed the material into the cylinder of the screw press, with or without pressure. The inner surface of the lower part of the feeding device may be smooth or interrupted in a suitable manner, e. g. provided with recesses, ribs or the like over the whole of its length or over a part thereof.

The mixing and feeding devices may be driven synchronously or asynchronously with the press screw to be supplied with material. In case of a vertical position of the press screw the feeding device may be disposed in an axial direction of the press screw.

In order to eliminate the above mentioned different flowing speeds occurring in the cross section of the cross head bore and the non-uniformities of the product thereby caused, the cross head has several channels or ducts of the same effective length, whose discharge openings are disposed concentrically to the central bore of the cross head. A plurality of such devices may be provided, and the discharge openings may be in the same plane or in different planes. Instead of channels, guide surfaces and other guiding and equalizing devices may be provided.

The discharge nozzle may be arranged so as to be rotatable about their axis. In case of the provision of a plurality of coaxially arranged discharge nozzles the same may rotate with equal speed or with different speeds, in the same or in opposite directions.

The invention and its features, objects and advantages will be better understood by reference to the following detailed description in connection with the accompanying drawing, showing by way of example some embodiments of a machine to which the invention has been applied.

Figure 1:
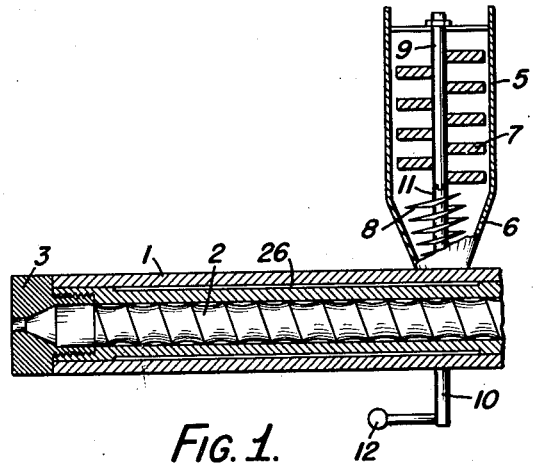
Figure 5:
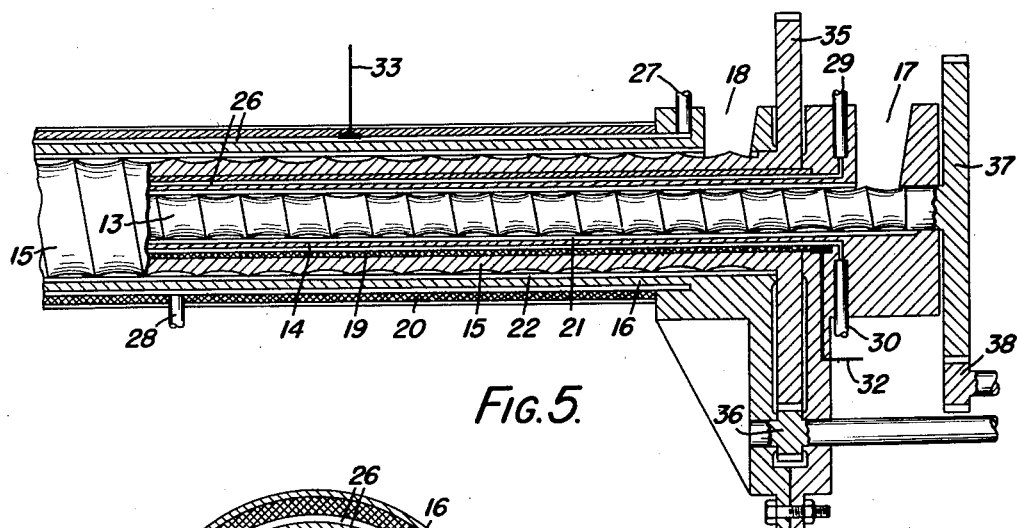
Figure 6:
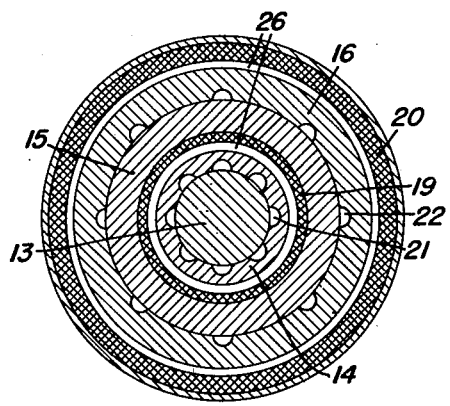

In the drawings:

Fig. 1 is a fragmentary vertical longitudinal section through a screw press embodying the invention, including the feeding device for the material, Fig. 2 is a cross section of a part of Fig. 1, Fig. 3 is a vertical section of the lower part of a feeding device and of the press screw shown in Fig. 1, Fig. 4 is a longitudinal section showing a special modification in which the press screw projects into the head of the nozzle, Fig. 5 is a vertical longitudinal section through a part of the screw press with two coaxial press screws including their companion cylinders, Fig. 6 is a cross section through Fig. 5, Fig. 7 is one half of the development of a section through the inner part of a cross head, and Fig. 8 is a cross section through the cross head, in the vicinity of the discharge openings.

Similar reference numerals denote similar parts in the different views.

In Figs. 1 to 4 the press screw 2 is mounted for rotation in the cylinder 1 of the screw press. At the exit end of the cylinder 1, the nozzle head is designated 3. Provided on the inner surface of the cylinder 1 are grooves 4 which prevent sticking to the screw of the material to be moulded or pressed. The material to be fed is supplied into the feeding device 5, whose lower part 6 in this case is conically contracted. Centrally mounted in the cylinder is a shaft 9 whose upper part bears mixing blades 7. Through a coupling 11 it is coupled with a shaft 10, said coupling being operable by a hand lever 12. Mounted on the lower part of the shaft 10 is a conveyer or press screw 8 which feeds the material to the press screw 2.

In the embodiment of Figs. 5 and 6, two press screws 13 and 15 are arranged coaxially to each other. The press screw 13 operates in its companion cylinder 14, and the material is fed to it through the feed opening 17. Mounted for rotation on cylinder 14 is an outer press screw 15 which is arranged in a cylinder 16 and whose feed opening is denoted 18. Screw 13 may be driven by gears 38 and 37 from any suitable source of power, while screw 15 may be driven by gears 36 and 35 from any suitable source of power. The screw press is provided with a resistance winding or coil 20 for electric heating. Moreover, a heating coil 19 can be provided in the interior of the press.

Since it has been found in the operation of these presses that the material owing to the compression and the friction through the press screw is intensively heated even when the heating device is switched out, it is advantageous to provide cooling channels 26 through which burning of the material can be prevented if a cooling agent is circulated through the channels. The cooling agent can be supplied to the outer and inner channels 26 through ducts 27 and 29, respectively, and exhausted therefrom through ducts 28 and 30, respectively. Temperature sensing devices 32 and 33 of conventional construction may control the switches to the heating coils 19 and 20 and the valves that control the flow of the cooling agent to the channels 26.

In the same manner as in case of the screw presses shown in Figs. 1 to 3, grooves 21 and 22 may be provided on the interior surfaces of the two cylinders 14 and 16.

As mentioned above, Fig. 7 shows a development of a vertical section through a cross head shown in Fig. 8 in a cross sectional view. It will be seen from Fig. 7 that the passage channels 23 from the feed opening 24 to the discharge openings 23 are of equal length, so that the above mentioned drawbacks are avoided.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. A screw extruder for manufacturing articles from a material formable under heat, comprising in combination, a stationary casing having an inner wall and an inlet opening for the material; a screw rotatably mounted in said casing coaxially thereof, said screw upon rotation conveying the material entering through said inlet opening through the casing; a nozzle head forming the outlet of said casing; heating and cooling means in said casing for keeping the temperature of the material in said casing substantially constant; said casing having straight longitudinal grooves in its inner wall extending in the direction of the axis of said casing up to said nozzle head, said grooves forming interruptions of the surface of the inner wall of said casing, whereby said grooves receive quantities of the material sufficient for preventing a tangential movement and sliding of the material on the inner wall of said casing so as to render impossible a sticking of the warm material to said screw during the conveying of the material through the casing.

2. A screw extrusion press for manufacturing articles from synthetic resins that are formable under heat and pressure, comprising a stationary casing having a bore extending therethrough, a screw rotatable in said bore and having a bore extending axially therethrough, a sleeve mounted in said screw and secured to said casing against rotation, a second screw rotatably mounted in said sleeve coaxially of the first screw, an inlet through which work material is suppliable to the first bore, and an inlet through which a separate work material is suppliable to the space between said sleeve and the second screw, the wall of said bore confronting said first screw and the inside wall of said sleeve confronting said second screw being each provided with a plurality of angularly-spaced straight grooves that extend longitudinally in the direction of the common axis of said bore and sleeve to prevent adherence of the work materials to the respective screws and to insure feed of the work materials through the bore and sleeve, respectively, as the respective screws rotate.

3. A screw extrusion press for manufacturing articles from synthetic resins that are formable under heat and pressure, comprising a stationary casing having a bore extending therethrough, a screw rotatable in said bore and having a bore extending axially therethrough, a sleeve mounted in said screw and secured to said casing against rotation, a second screw rotatably mounted in said sleeve coaxially of the first screw, an inlet in said casing through which work material is suppliable to the first bore, and an inlet in said casing through which a separate work material is suppliable to the space between said sleeve and the second screw, the wall of said bore confronting said first screw and the inside wall of said sleeve confronting said second screw being provided with a plurality of spaced grooves that extend longitudinally in the direction of the common axis of said bore and sleeve to prevent adherence of the work materials to the screws and to insure feed of the work materials through the two bores at a constant rate as the respective screws rotate, means for maintaining the temperature of the work material in the first bore constant and separate means for maintaining the temperature of the work material in the sleeve constant.

4. A screw extrusion press for manufacturing articles from compounds containing synthetic resins that are formable under heat and pressure, comprising a stationary casing having a bore, an inlet through which the work material may be fed into said bore, and an outlet, a conveying and press screw rotatably mounted in said bore, and a shaping nozzle adjoining said outlet to receive therefrom the material that is conveyed by said screw through said casing, and characterized by the fact that the inside wall of said bore is provided with a plurality of angularly spaced straight grooves that extend longitudinally in the direction of the axis of said bore and for the full length of said bore up to the shaping nozzle and that prevent adherence of the plasticized work material to the rotating screw, whereby to insure conveying and extrusion of the work material at an approximately constant rate through said bore to said outlet and to said shaping nozzle as said screw rotates.

5. A screw extrusion press for manufacturing articles from compounds containing synthetic resins that are formable under heat and pressure, comprising a stationary casing having a bore, an inlet through which the work material may be fed into said bore, and an outlet, a conveying and press screw rotatably mounted in said bore, and a shaping nozzle adjoining said outlet to receive therefrom the material that is conveyed by said screw through said casing, and characterized by the fact that the inside wall of said bore is provided with a plurality of angularly spaced straight grooves that extend longitudinally in the direction of the axis of said bore up to the shaping nozzle, said grooves preventing adherence of the plasticized work material to the rotating screw, and by the fact that said nozzle is also provided with a plurality of angularly spaced internal grooves which extend axially of the bore thereof from said outlet for a part only of the length of the nozzle and which stop short of the mouth of said nozzle.

6. A screw extrusion press for manufacturing articles from compounds containing synthetic resins that are formable under heat and pressure comprising a stationary cylindrical casing, a plurality of rotatable conveying and press screws mounted coaxially with each other and one within another, and means for feeding separate work materials to said separate screws, and a single shaping nozzle into which all of said screws force the work materials which they convey, and characterized by the fact that each of said screws rotates in its own separate stationary cylindrical casing which is also mounted coaxially around its screw, the first-named stationary cylindrical casing constituting the casing for the outermost screw, and said outermost screw rotating in the bore of the first-named cylindrical casing, separate means for controlling the temperature of the work material in each casing to maintain the temperature of said work material constant, the inside wall of the bore of each casing being provided with a plurality of angularly spaced longitudinal grooves extending in the direction of the axis of said bore up to said shaping nozzle, so as to prevent adherence of the plasticized work materials to the rotating screws and to insure extrusion of the work materials at substantially constant speed through the bores of said casings and into said shaping nozzle as said screws rotate.

7. A screw extrusion press for manufacturing articles from compounds containing synthetic resins that are formable under heat and pressure comprising a stationary cylindrical casing, a plurality of rotatable conveying and press screws mounted coaxially with each other and one within another, and means for feeding separate work materials to said separate screws, and a single shaping nozzle into which all of said screws force the work materials which they convey, and characterized by the fact that each of said screws rotates in its own separate stationary cylindrical casing which is also mounted coaxially around its screw, the first named stationary cylindrical casing constituting the casing for the outermost screw, and said outermost screw rotating in the bore of said first-named cylindrical casing, separate means for controlling the temperature of the work material in each casing to maintain the temperature of said work material constant, the inside wall of the bore of each casing being provided with a plurality of angularly spaced longitudinal grooves extending in the direction of the axis of said bore up to said shaping nozzle, and the inside wall of the bore of said nozzle also being provided with grooves extending longitudinally in the direction of the axis of said nozzle from said casing for a portion only of the length of said nozzle and stopping short of the mouth of said nozzle, so as to prevent adherence of the plasticized work materials to the rotating screws and to insure extrusion of the work materials at substantially constant speed through the bores of said casings and into said shaping nozzle as said screws rotate.

8. A screw extrusion press for manufacturing articles from compounds containing synthetic resins that are formable under heat and pressure, comprising a plurality of rotatable conveying and press screws mounted coaxially and concentrically with one another, means for feeding separate work materials to said separate screws, and at least one shaping nozzle, and characterized by the fact that each of said screws rotates in a stationary cylinder and said cylinders have separate and independent temperature controlling means to maintain the temperature of the work materials constant, each of said stationary cylinders being provided with longitudinal grooves in its inside wall facing its screw, said grooves extending in the direction of the axis of said cylinders up to said shaping nozzle, so as to prevent adherence of the plasticized work materials to the rotating screws.

9. A screw extrusion press for manufacturing articles from compounds containing synthetic resins that are formable under heat and pressure comprising a plurality of stationary hollow casings mounted coaxially one within the other, the inside wall of each casing having a plurality of angularly-spaced longitudinal grooves extending in the direction of the common axis of said casings, a screw mounted in each casing to rotate on said common axis, each screw, except the innermost, surrounding the next inner casing, means for rotating said screws, means for feeding separate work material to the interior of each casing so that said material may be fed forwardly in its casing on rotation of the associated screw, said grooves preventing adherence of the plasticized work material to the screws rotating in said casings, a shaping nozzle disposed at the forward end of at least one of said casings to communicate with the interior of said one casing and to receive from said one casing the work material that is fed forwardly by the screw rotating in said one casing, the grooves in said one casing extending up to said shaping nozzle, and said cylinders having, respectively, separate and independent temperature controlling means to maintain constant the temperature of the work material being fed therethrough.

References Cited in the file of this patent

UNITED STATES PATENTS

| Number | Name | Date |
|---|---|---|
| 72,393 | Hale | Dec. 17, 1867 |
| 277,707 | Gonon | May 15, 1883 |
| 348,132 | Leopold | Aug. 24, 1886 |
| 484,777 | Chase | Oct. 25, 1892 |
| 523,116 | Gelinck | July 17, 1894 |
| 682,390 | Schrader | Sept. 10, 1901 |
| 858,354 | Sharpneck | June 25, 1907 |
| 1,516,841 | Buttfield | Nov. 25, 1924 |
| 2,200,997 | Royle | May 14, 1940 |